United States Patent [19]

Schwartz et al.

[11] Patent Number: 5,024,698

[45] Date of Patent: * Jun. 18, 1991

[54] MONOAZO PIGMENT COMPOSITIONS

[75] Inventors: Russell J. Schwartz; Manuel Z. Gregorio, both of Cincinnati, Ohio

[73] Assignee: Sun Chemical Corporation, Fort Lee, N.J.

[ * ] Notice: The portion of the term of this patent subsequent to Aug. 7, 2007 has been disclaimed.

[21] Appl. No.: 497,385

[22] Filed: Mar. 22, 1990

[51] Int. Cl.$^5$ .................... C09D 11/00; C09D 11/02; C09D 11/16
[52] U.S. Cl. ........................... 106/20; 106/493; 106/494; 106/496; 106/499; 106/500; 534/558; 534/564; 534/579; 534/581; 534/585; 534/682; 534/683; 534/885; 534/886
[58] Field of Search .................. 106/496, 20

[56] References Cited

U.S. PATENT DOCUMENTS 4,946,508  8/1990  Schwartz et al. .................. 106/496
4,946,509  8/1990  Schwartz et al. .................. 106/496

OTHER PUBLICATIONS

U.S. patent application Ser. No. 07/356,022 filing date 5-23-89, Schwartz et al.

*Primary Examiner*—William R. Dixon, Jr.
*Assistant Examiner*—Margaret V. Einsmann
*Attorney, Agent, or Firm*—Jack Matalon

[57] ABSTRACT

Monoazo pigments are provided which have improved properties achieved by incorporating certain azomethine compounds. The pigment compositions are prepared by reacting a primary amine-terminated alkylene oxide polymer and an acetoacetanilide to form an azomethine coupler and subsequently preparing the monoazo pigment composition by reacting the desired diazo component and coupling component in the presence of the azomethine coupler so as to form an azomethine composition of matter and the desired pigment.

16 Claims, No Drawings

MONOAZO PIGMENT COMPOSITIONS

BACKGROUND OF THE INVENTION

This invention relates to certain azomethine compositions and to monoazo pigments modified by such azomethine compositions.

Monazo pigments represent an important class of colorants for coatings and printing inks. Various methods have appeared in the prior art for improving the properties of such pigments. For example, U.S. Pat. No. 4,720,304 describes the use of imidazole-modified dyes to impart enhanced tinctorial strength, rheology and printing properties to such pigments. Preparation of the modifying compounds requires the use of formaldehyde and the resultant dyes are very system specific due to their substantial tinctorial power. In contradistinction thereto, the azomethine compositions of the present invention contribute relatively little coloration effects due to their high molecular weights. In a similar vein, U.S. Pat. No. 4,664,714 discloses the use of cyanuric chloride-modified dyes to impart improved gloss rheology and stability, but this method has limitations similar to those of U.S. Pat. No. 4,720,304.

U.S. Pat. No. 4,341,701 teaches that pigments exhibiting improved flow properties, increased color strength, increased transparency and improved dispersability can be prepared by a two-step coupling method. However, that technique is less economical and more prone to the generation of impurities which can result in "dirty" shades. Other patents such as U.S. Pat. Nos. 4,415,705; 4,812,517; 4,762,568 and British Patent 1,510,190 teach of the use of colorless polymeric pigment dispersants, but none of the methods disclosed in such patents have been found to be as effective as the compositions and methods of the present invention.

DETAILS OF THE INVENTION

Monoazo pigment compositions exhibiting increased tinctorial strength, gloss transparency and lower rheology in coatings as well as in solvent-based and water-based printing inks are obtained by means of the present invention.

The present invention is directed to an azomethine composition of matter having the formula:

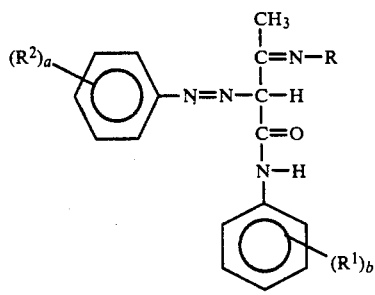

wherein:
R is an alkylene oxide polymer;
$R^1$ is independently selected from the group consisting of Cl, $OCH_3$, $CH_3$, $OC_2H_5$, $C_2H_5$ and $CONH_2$;
$R^2$ is independently selected from the group consisting of Cl, $OCH_3$, $CH_3$, $NO_2$, $OC_2H_5$, $C_2H_5$, $CONH_2$, $SO_3H$, OH and COOH; and
a and b are independently integers of 0 to 5.

Preferably, $R^1$ is independently selected from the group consisting of Cl, $OCH_3$ and $CH_3$. Preferably, $R^2$ is independently selected from the group consisting of Cl, $OCH_3$, $CH_3$ and $NO_2$. It is to be understood that the term "independently" selected means that all $R^1$ substituents may be the same; some $R^1$ substituents may be the same or each $R^1$ may be a different moiety selected from the indicated group. Similarly all $R^2$ substituents may be the same, some $R^2$ substituents may be the same, or each $R^2$ may be a different moiety selected from the indicated group. As applied to subscripts a and b, the term "independently" means that a and b may have the same or different values as integers between the range of 0 and 5 inclusive.

Preferably, the alkylene oxide polymer ("R" in the formula) is an ethylene oxide polymer, propylene oxide polymer or ethylene oxide/propylene oxide copolymer having a number average molecular weight of from about 500 to about 20,000, preferably 1000 to 5000, and the alkylene moiety contains 2 to 8 carbon atoms. Particularly preferred are ethylene oxide/propylene oxide polymers having the formula:

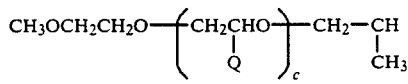

wherein c is an integer of 4 to about 200, preferably 4 to 60, and Q is H or $CH_3$.

The present invention also relates to monoazo pigment compositions comprising at least one monoazo pigment and the azomethine composition of matter described above. Generally, the azomethine composition of matter will be present in an amount of not more than about 50 wt. %, preferably in an amount of 5 to 30 wt. %, based on the weight of the pigment composition (i.e. the pigment plus azomethine). Preferably, the monoazo pigment will be selected from the group consisting of Pigment Yellow 1, Pigment Yellow 3, Pigment Yellow 65, Pigment Yellow 73, Pigment Yellow 74, Pigment Yellow 75, Pigment Yellow 97, Pigment Yellow 98, Pigment Orange 5, Pigment Red 2, Pigment Red 9, Pigment Red 14. Pigment Red 17, Pigment Red 22, Pigment Red 23, Pigment Red 112. Pigment Red 170 and Pigment Red 210.

The azomethine composition of matter of the present invention may be synthesized and subsequently added to the desired monoarylide pigment. If this method is employed, the azomethine composition of matter should be added as the monoarylide pigment is being prepared. However, the preferable approach is one which involves the following steps:

(a) formation of an azomethine coupling agent by reacting a primary amine-terminated alkylene oxide polymer and an acetoacetanilide;
(b) formation of a diazonium salt by reaction of the desired diazo component with nitrous acid and hydrochloric acid;
(c) reacting the diazonium salt together with the desired coupling component in the presence of the azomethine coupler so as to produce the azomethine composition of matter together with the monoazo pigment.

The choice of the diazo component and coupling component will depend on the monoazo pigment of choice. These components are well known in the prior art; some examples of these components are shown in Table I below:

TABLE I
REPRESENTATIVE MONAZO PIGMENTS

| Pigment Type | Diazo Component | Coupling Component |
|---|---|---|
| P.Y. 1 | o-nitro, p-toluidine | acetoacetanilide |
| P.Y. 3 | o-nitro, p-chloroaniline | acetoacet-o-chloranilide |
| P.Y. 65 | o-nitro,p-anisidine | acetoacet-o-anisidide |
| P.Y. 73 | o-nitro, p-chloroaniline | acetoacet-o-anisidide |
| P.Y. 74 | p-nitro, p-chloroaniline | acetoacet-p-phenitide |
| P.O. 5 | 2,4-dinitroaniline | 2-naphthol |
| P.R. 2 | 2,5-dichloroaniline | 2-napthalenecarboxamide, 3-hydroxy-N-phenyl |
| P.R. 22 | 5-nitro, o-toluidine | 2-napthalenecarboxamide, 3-hydroxy-N-phenyl |
| P.R. 23 | 5-nitro, o-anisidine | 2-naphthalenecarboxamide, 3-hydroxy-N-(3-Nitrophenyl) |
| P.R. 112 | 2,4,5-trichloroaniline | 2-naphthalenecarboxamide, 3-hydroxy-N-(2-methylphenyl) |
| P.R. 170 | p-aminobenzamide | 2-naphthalenecarboxamide, 3-hydroxy-N-(3-ethoxylphenyl) |

The primary amine-terminated alkylene oxide polymer (the term "polymer" includes oligomers) employed in the preparation of the azomethine coupler is preferably one wherein the aklylene oxide polymer is an ethylene oxide or propylene oxide polymer or a propylene oxide/ethylene oxide copolymer. Examples of these types of compounds are the "Jeffamine M" series, available from the Texaco Chemical Corporation. These amine-terminated polymers have the general formula:

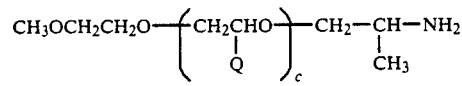

wherein c is an integer of 4 to about 200, and Q is H or $CH_3$.

The preferred process for preparing a pigment composition containing a monoazo pigment (Pigment Yellow 74) and an azomethine composition of matter may be illustrated as follows:

(a) preparation of the azomethine coupler:

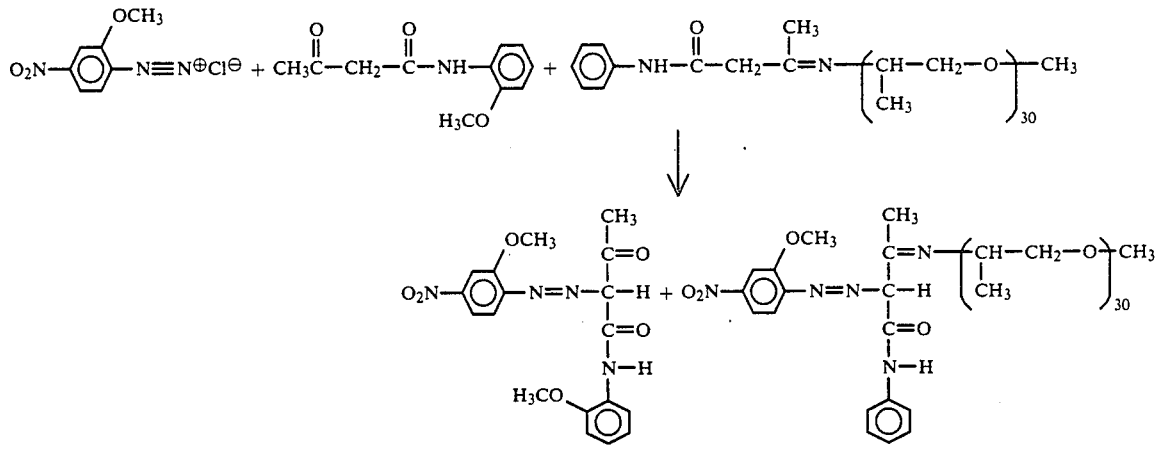

(b) preparation of diazonium salt:

(c) preparation of pigment composition comprising Pigment Yellow 74 and azomethine composition of matter:

Pigment Yellow 74   Azomethine Composition of Matter

The pigment composition is typically isolated by filtration, and the "presscake" is dried by conventional methods unless it is intended for use in a water-based system in which case it may be utilized in the presscake form.

The monoazo pigment compositions of the present invention are useful in a variety of applications when formulated with the usual resins. Such applications are apparent from Table II set forth below:

TABLE II
TYPICAL APPLICATIONS

| Application | Solvent | Resin |
|---|---|---|
| Water Gravure | Water | Acrylics, |

TABLE II-continued
TYPICAL APPLICATIONS

| Application | Solvent | Resin |
|---|---|---|
| Ink | | Styrene-Acrylics |
| Water Flexo Ink | Water | Acrylics, Styrene-Acrylics |
| C-Type Gravure Ink | Aromatics/Acetate | Nitrocellulose/Modif. Rosins |
| E-Type Gravure Ink | Alcohol/Acetate | Nitrocellulose/Alc. Sol. Resins |
| T-Type Gravure Ink | Aromatics | Hydrocarbons |
| Pub. Gravure Ink | Toluene or Lactol Spirits | Metal Resinates, Hydrocarbons |
| Heatset/Sheetfed Inks | High Boiling Aliphatics | Hydrocarbons, Mod. Rosins |
| Metal Decorating Inks | Tridecyl Alcohol | Mod. Rosins |
| Alkyd Paints | Aromatics/Aliphatics | Alkyds |
| Thermosetting Acrylic Paints | Arom./Ketones/Alcohols | Melamine-acrylic |
| Thermoplastic Acrylic Paints | Aromatics/Aliphatics | Melamine-acrylic |
| Latex Paints | Water/Ethylene Glycol | Acrylics, Styrene-Butadiene |

The following examples set forth methods whereby the pigment compositions of the present invention were produced. Unless otherwise indicated, all parts and percentages are by weight.

EXAMPLE 1

Preparation of Azomethine Coupler A

One hundred parts of a primary amine-terminated polymer comprised of 70% ethylene oxide and 30% propylene oxide and having a number average molecular weight of 2000 ("Jeffamine M2070," Texaco Chemical Corp.) were charged into a 500 ml 4-neck reaction vessel equipped with a stirrer, nitrogen sparger, heating mantle, thermometer and a Dean-Stark water separator. Thereafter, 8.9 parts of acetoacetanilide were added, and the resulting mixture was stirred and heated to 105° C. over a period of 1 hour. The resultant solution was then maintained at 105° C. for 1 hour at which time the reaction was complete as evidenced by the disappearance of the characteristic carbonyl adsorption at 1725 cm$^1$ in the infrared spectrum. The resultant product was a slightly yellow, clear liquid having a viscosity of 800-1200 centipoise at 25° C.

EXAMPLE 2

Preparation of Azomethine Coupler B

The procedure of Example 1 was repeated utilizing 100 parts of a primary amine-terminated polymer comprised of 95% propylene oxide and 5% ethylene oxide and having a number average molecular weight of 2000 (Jeffamine M2005, Texaco Chemical Corp.). The resultant product was a slightly yellow, clear liquid having a viscosity of 1000-1200 centipoise at 25° C.

EXAMPLE 3

26.3 parts of p-nitro-o-anisidine were slurried in 300 parts water and 42 parts 31% hydrochloric acid for 30 minutes at room temperature. The slurry was iced to 0° C. and 29.0 parts of 38% aqueous sodium nitrite solution is added. After stirring for 90 minutes at 3°-5° C., the resulting diazo solution was adjusted to a volume of 500 parts at 5° C. by the addition of ice and water. 33.0 parts of aceto-acet-o-anisidide (AAOA) were dissolved in 700 parts water and 26.0 parts of 50% sodium hydroxide solution. The volume was then adjusted to 1000 parts at 10° C. by adding ice/water, then AAOA was precipitated by the addition of 30.0 parts of 70% acetic acid and the pH was adjusted to 6.0-6.2. The final volume was then adjusted to 1300 parts at 15° C. with the addition of ice/water.

Coupling took place by the addition of the diazo solution to the precipitated AAOA over a period of 40 minutes. During this time, 11.5 parts of the azomethine coupler A of Example 1 were added simultaneously with the diazo solution. When the coupling was completed, the pigment suspension was heated to 90° C., filtered, and washed and dried at 70° C., to give 70.0 parts of a pigment composition comprising Pigment Yellow 74 and an azomethine composition of matter.

The Pigment Yellow 74 plus azomethine composition was evaluated by charging 25 parts of the composition to 75 parts of a water-based ink vehicle containing an acrylic resin ("Joncryl 67", S. C. Johnson & Co.) and 300 parts of 3.2 mm stainless steel balls. The mixture was placed on a "Red Devil" paint shaker for 30 minutes to produce a mill base. The viscosity of the mill base was approximately 60% less than that of a mill base of Pigment Yellow 74 containing no azomethine. A water flexo ink prepared by letback of the mill base with additional vehicle and water to print viscosity was 20% stronger, glossier and more transparent than an ink prepared similarly from Pigment Yellow 74 containing no azomethine.

EXAMPLE 4

Example 3 was repeated using 11.5 parts of the azomethine coupler B of Example 2 instead of the azomethine coupler A of Example 1; a Pigment Yellow 74 composition in the amount of 71.2 parts was obtained. This composition was evaluated in a C-type packaging gravure ink by charging 25 parts of the pigment composition to 75 parts of a resin soluble nitrocellulose-based grind vehicle with 300 parts of 3.2 mm stainless steel balls. The mixture was placed on a "Red Devil" paint shaker for 30 minutes to produce a mill base, which was then further letdown with 180 parts of a typical maleic resin solution containing toluene and isopropyl acetate. The ink was adjusted to print viscosity by addition of isopropyl acetate. The ink prepared from the Pigment Yellow 74 composition containing the azomethine was found to be 15-20% stronger and considerably more glossy and transparent compared to an ink made from a conventional Pigment Yellow 74 containing no azomethine.

EXAMPLE 5

20.2 parts of 5-nitro-o-toluidine were dissolved in 280 parts water and 42.7 parts 31% hydrochloric acid at 65° C. The volume was adjusted to 600 parts at 3°-5° C. using ice/water, and 24.6 parts of aqueous sodium nitrite solution were added and the solution was stirred for 60 minutes at 5°-7° C. 20.8 parts of 70% acetic acid were then added to the resultant diazo solution and the final volume was adjusted to 700 parts with the addition of ice/water.

3,4,7, of 2-naphthalenecarboxamide, 3-hydroxy-N-phenyl (Naphthol AS) were dissolved in 600 parts water and 30 parts of 50% sodium hydroxide solution at 75° C. 2.0 parts of sulfated castor oil were added and the volume was adjusted to 1300 parts at 30° C.

The diazo solution was then added to the Naphthol AS solution over 25 minutes, together with 10.8 parts of azomethine coupler B, and the mixture was stirred for 30 minutes to complete coupling. The resultant pigment slurry was heated to 90° C., filtered, washed, and dried at 70° C., to yield 65.7 parts of a Pigment Red 22 composition. This composition was then evaluated in an E-type packaging gravure ink by charging 20 parts of the pigment composition to 80 parts of solvent-soluble nitrocellulose-based grind vehicle with 300 parts of 3.2 mm stainless steel balls. The mixture was placed on a "Red Devil" paint shaker for 30 minutes to produce a mill base which was then letdown with 34 parts of a typical maleic resin solution containing -N-propyl alcohol. The ink was adjusted to print viscosity by the addition of an 80:20 blend of ethyl alcohol and N-propyl alcohol. The ink prepared from the Pigment Red 22 composition containing the azomethine was 15-20% stronger, glossier and more transparent than a comparing ink prepared from conventional Pigment Red 22 containing no azomethine.

EXAMPLE 6

18.0 parts of 5-nitro-o-anisidine were dissolved in 400 parts of water and 21.5 parts of 96% sulfuric acid at 30° C 19.8 parts of 38% aqueous sodium nitrite were added and the solution stirred for 30 minutes at 25°-30° C. 15.2 parts of 70% acetic acid were then added and the volume of the resultant diazo solution was adjusted to 500 parts at 30° C.

33.8 parts of 2-naphthalenecarboxamide, 3-hydroxy-N-(3-nitrophenyl), i.e. "Naphthol AS-BS," were dissolved in 1,500 parts water and 21.8 parts of 50% sodium hydroxide solution at 85° C. 17.5 parts of sodium acetate were added and the volume was then adjusted to 1,900 parts at 80° C.

The diazo solution was added to the Naphthol AS-BS solution over a period of 15 minutes, together with simultaneous addition of 8.2 parts of azomethine coupler B. The mixture was stirred for 10 minutes at 80°-85° C. to complete coupling. The pigment suspension was heated to 90°-95° C. and stirred for 20 minutes and then filtered, washed and dried at 70° C., to yield 58.9 parts of a Pigment Red 23 composition containing an azomethine.

Evaluation of the Pigment Red 23 composition was performed in a C-type packaging gravure ink, as in Example 2. The ink prepared from the pigment composition containing the azomethine composition was 10% stronger, glossier and more transparent compared to an ink made from a conventional Pigment Red 23 containing no azomethine.

As may be seen from the Examples set forth above, the monoazo pigment compositions of the present invention exhibit significantly improved properties when compared to conventionally prepared monoazo pigments. In particular, the monoazo pigment compositions of the present invention result in lower viscosity inks and coatings exhibiting enhanced gloss, strength and transparency.

The modified monoazo pigments of the present invention may be utilized in all applications calling for monoazo pigments. They are especially useful water-based flexographic inks and solvent-based packaging inks which would otherwise contain conventionally-prepared monoazo pigments.

While certain representative embodiments and details have been shown for the purpose of illustrating the invention, it will be apparent to those skilled in the art that various changes may be made therein without departing from the spirit or scope of the invention.

What is claimed is:

1. An azomethine composition of matter having the formula:

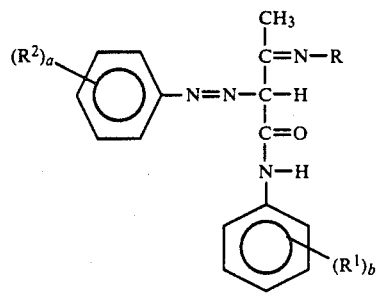

wherein:
R is an alkylene oxide polymer;
$R^1$ is independently selected from the group consisting of Cl, $OCH_3$, $CH_3$, $OC_2H_5$, $C_2H_5$ and $CONH_2$;
$R^2$ is independently selected from the group consisting of Cl, $OCH_3$, $CH_3$, $NO_2$, $OC_2H_5$, $C_2H_5$, $CONH_2$, $SO_3H$, OH and COOH; and a and b are independently integers of 0 to 5.

2. A composition of matter as claimed in claim 1, wherein the aklylene oxide polymer has a number average molecular weight of from about 500 to about 20,000 and the alkylene moiety contains 2 to 8 carbon atoms.

3. The composition of matter of claim 2 wherein the polymer has a number average molecular weight of 1000 to 5000.

4. The composition of matter of claim 2 wherein the alkylene oxide polymer is an ethylene oxide polymer.

5. A composition of matter as claimed in claim 2, wherein the alkylene oxide polymer is a propylene oxide polymer.

6. A composition of matter as claimed in claim 2, wherein the alkylene oxide polymer is an ethylene oxide propylene oxide copolymer.

7. A composition of matter as claimed in claim 1, wherein the polymer has the formula:

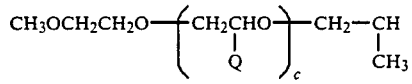

wherein
c is an integer of 4 to about 200, and
Q is H or $CH_3$.

8. A composition of matter as claimed in claim 7 wherein c has a value of 4 to 60.

9. The azomethine composition of claim 1 where $R^1$ is independently selected from the group consisting of Cl, $OCH_3$ and $CH_3$.

10. The azomethine composition of claim 1 wherein $R^2$ is independently selected from the group consisting of Cl, $OCH_3$, $CH_3$ and $NO_2$.

11. A monoazo pigment composition comprising at least one monoazo pigment and the azomethine composition of matter as claimed in claim 1.

12. A pigment composition as claimed in claim 11 wherein the azomethine composition of matter is present in the pigment composition in an amount of not more than about 50 wt. %, based on the weight of the pigment composition.

13. A pigment composition as claimed in claim 12, wherein the azomethine composition of matter is present in an amount of 5 to 30 wt. %, based on the weight of the pigment composition.

14. A pigment composition as claimed in claim 11, wherein the monoazo pigment is selected from the group consisting of Pigment Yellow 1, Pigment Yellow 3, Pigment Yellow 65, Pigment Yellow 73, Pigment Yellow 74, Pigment Yellow 75, Pigment Yellow 97, Pigment Yellow 98, Pigment Orange 5, Pigment Red 2, Pigment Red 9, Pigment Red 14, Pigment Red 17, Pigment Red 22, Pigment Red 23, Pigment Red 112, Pigment Red 170 and Pigment Red 210.

15. A printing ink composition comprising at least one monoazo Pigment, at least one solvent, at least one resin and the azomethine composition of matter as claimed in claim 1.

16. A printing ink composition as claimed in claim 15 wherein the monoazo pigment is selected from the group consisting of Pigment Yellow 1, Pigment Yellow 3, Pigment Yellow 65, Pigment Yellow 73, Pigment Yellow 74, Pigment Yellow 75, Pigment Yellow 97, Pigment Yellow 98, Pigment Orange 5, Pigment Red 2, Pigment Red 9, Pigment Red 14, Pigment Red 17, Pigment Red 22, Pigment Red 23, Pigment Red 112, Pigment Red 170 and Pigment Red 210.

* * * * *